United States Patent
Kazlauskas et al.

(10) Patent No.: US 11,831,407 B1
(45) Date of Patent: Nov. 28, 2023

(54) NON-CUSTODIAL TECHNIQUES FOR DATA ENCRYPTION AND DECRYPTION

(71) Applicant: Corsali, Inc., San Francisco, CA (US)

(72) Inventors: Anna Kazlauskas, San Francisco, CA (US); Zachary Donald Hay, San Francisco, CA (US); Kahtaf Alam, Toronto (CA); Daniel Rasmuson, Austin, TX (US)

(73) Assignee: Corsali, Inc., San Francisco, CA (US)

( * ) Notice: Subject to any disclaimer, the term of this patent is extended or adjusted under 35 U.S.C. 154(b) by 0 days.

(21) Appl. No.: 18/100,925

(22) Filed: Jan. 24, 2023

(51) Int. Cl.
*H04L 9/08* (2006.01)
*G06F 21/60* (2013.01)
*H04L 9/40* (2022.01)
*H04L 9/32* (2006.01)

(52) U.S. Cl.
CPC .......... *H04L 9/0861* (2013.01); *G06F 21/602* (2013.01); *H04L 9/085* (2013.01); *H04L 9/3247* (2013.01); *H04L 63/083* (2013.01)

(58) Field of Classification Search
CPC ..... H04L 9/0861; H04L 9/085; H04L 9/3247; H04L 63/083; G06F 21/602
See application file for complete search history.

(56) References Cited

U.S. PATENT DOCUMENTS

| | | | |
|---|---|---|---|
| 1,436,588 A | 11/1922 | Griffith | |
| 8,819,841 B2 * | 8/2014 | Parks | H04L 65/60 713/168 |
| 10,630,682 B1 * | 4/2020 | Bhattacharyya | H04L 63/061 |
| 2009/0282254 A1 * | 11/2009 | Wheller | H04W 12/10 713/172 |
| 2012/0066490 A1 * | 3/2012 | Sato | H04L 9/0877 713/153 |
| 2013/0191647 A1 * | 7/2013 | Ferrara, Jr. | G16H 10/60 713/186 |
| 2015/0088754 A1 * | 3/2015 | Kirsch | G06Q 20/401 713/171 |
| 2016/0012465 A1 | 1/2016 | Sharp | |

OTHER PUBLICATIONS

Add Wallet Onboard to Your App, Available Online at: https://plaid.com/docs/wallet-onboard/add-to-app/, Accessed from Internet on Dec. 22, 2022, 1 page.

Authentication Using JWT, Hasura Inc., Available Online at: https://hasura.io/docs/latest/auth/authentication/jwt/, 2022, 20 pages.

(Continued)

*Primary Examiner* — Abiy Getachew
(74) *Attorney, Agent, or Firm* — Kilpatrick Townsend & Stockton LLP

(57) ABSTRACT

Systems and methods for employing non-custodial techniques for data encryption and decryption are provided. One example method includes transmitting, to a first remote server, an encryption request; receiving, from the first remote server, a first response comprising a secret token; generating a first cryptographic signature using the secret token; generating a first cryptographic key based on the first cryptographic signature; encrypting one or more files using the first cryptographic key; and transmitting, to a second remote server, the one or more encrypted files.

20 Claims, 10 Drawing Sheets

(56) References Cited

OTHER PUBLICATIONS

Bring Your Own JWT Providers, Available Online at: https://web3auth.io/docs/custom-authentication/byo-jwt-providers, Accessed from Internet on Dec. 22, 2022, 9 pages.
Can I Use Web3Auth Without the Modal?, Available Online at: https://github.com/Web3Auth/web3auth-web/discussions/337, Accessed from Internet on Dec. 27, 2022, 2 pages.
Control Access with Custom Claims and Security Rules, Available Online at: https://firebase.google.com/docs/auth/admin/custom-claims, Accessed from Internet on Dec. 22, 2022, pp. 1-11.
Creating Verifiers on the Web3Auth Dashboard, Available Online at: https://web3auth.io/docs/custom-authentication/verifiers, Accessed from Internet on Dec. 27, 2022, 15 pages.
Custom Authentication with Plug n Play Modal, Available Online at: https://web3auth.io/docs/sdk/web/modal/custom-authentication, Accessed from Internet on Dec. 27, 2022, 5 pages.
Google Social Login with Web3Auth, Available Online at: https://web3auth.io/docs/custom-authentication/social-providers/google#create-a-google-app, Accessed from Internet on Dec. 27, 2022, 4 pages.
Identity Platform Pricing, Available Online at: https://cloud.google.com/identity-platform/pricing, Accessed from Internet on Dec. 27, 2022, 6 pages.
Installation, Available Online at: https://web3auth.io/docs/sdk/self-host/installation, Accessed from Internet on Dec. 27, 2022, 12 pages.
Introduction to Wallet Onboard, Available Online at: https://plaid.com/docs/wallet-onboard/, Accessed from Internet on Dec. 22, 2022, 1 page.
Key Management and Security, Available Online at: https://web3auth.io/docs/overview/key-management/, Accessed from Internet on Dec. 27, 2022, 5 pages.
Migrating from Plug-and-Play to Custom Auth, Available Online at: https://github.com/Web3Auth/web3auth-web/discussions/421, Accessed from Internet on Dec. 27, 2022, 2 pages.
Privacy-First Auth to Onboard Your Users to Web3, Available Online at: https://www.privy.io/, Accessed from Internet on Dec. 27, 2022, 8 pages.
Shamir's Secret Sharing, Wikipedia, Available Online at: https://en.wikipedia.org/wiki/Shamir%27s_Secret_Sharing, Accessed from Internet on Dec. 22, 2022, pp. 1-8.
Social Login Users, Available Online at: https://web3auth.io/docs/server-side-verification/social-login-users#verifying-jwt-token-idtoken, Accessed from Internet on Dec. 22, 2022, pp. 1-6.
Usage Plug n Play Core, Available Online at: https://web3auth.io/docs/sdk/web/core/usage#openloginloginparams, Accessed from Internet on Dec. 27, 2022, 15 pages.
Using Auth0 with Web3Auth, Available Online at: https://web3auth.io/docs/guides/auth0, May 25, 2022, pp. 1-24.
Using Custom Authentication, Available Online at: https://web3auth.io/docs/custom-authentication/, Accessed from Internet on Dec. 22, 2022, pp. 1-4.
Web3Auth WalletConnect v1 Adapter, Available Online at: https://www.npmjs.com/package/@web3auth/wallet-connect-v1-adapter, Accessed from Internet on Dec. 27, 2022, 5 pages.
Jen, MetaMask API Method Deprecation, Available Online at: https://medium.com/metamask/metamask-api-method-deprecation-2b0564a84686, Jun. 27, 2022, 2 pages.
U.S. Appl. No. 18/101,010, "Non-Final Office Action", dated Apr. 7, 2023, 14 pages.

* cited by examiner

NON-CUSTODIAL TECHNIQUES FOR DATA ENCRYPTION AND DECRYPTION

FIELD

The present application generally relates to data storage and more particularly to non-custodial techniques for data encryption and decryption.

BACKGROUND

Modern web applications and other online software platforms collect and store large volumes of data generated by users. This data is often monetized by the platforms, for example, for the generation of advertising revenue. While this data is allowed to be exported and monetized by users, it is difficult for users to efficiently and securely store large volumes of confidential data. Users are unlikely to be familiar with file encryption and decryption technology. Moreover, users might be reluctant to trust third-party storage providers with their confidential data.

SUMMARY

Various examples are described for employing non-custodial techniques for data encryption and decryption. One example method includes transmitting, to a first remote server, an encryption request; receiving, from the first remote server, a first response comprising a secret token; generating a first cryptographic signature using the secret token; generating a first cryptographic key based on the first cryptographic signature; encrypting one or more files using the first cryptographic key; and transmitting, to a second remote server, the one or more encrypted files.

One example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to: transmit, to a first remote server, an encryption request; receive, from the first remote server, a first response comprising a secret token; generate a first cryptographic signature using the secret token; generate a first cryptographic key based on the first cryptographic signature; encrypt one or more files using the first cryptographic key; and transmit, to a second remote server, the one or more encrypted files.

One example non-transitory computer-readable comprises processor-executable instructions configured to cause one or more processors to transmit, to a first remote server, an encryption request; receive, from the first remote server, a first response comprising a secret token; generate a first cryptographic signature using the secret token; generate a first cryptographic key based on the first cryptographic signature; encrypt one or more files using the first cryptographic key; and transmit, to a second remote server, the one or more encrypted files.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
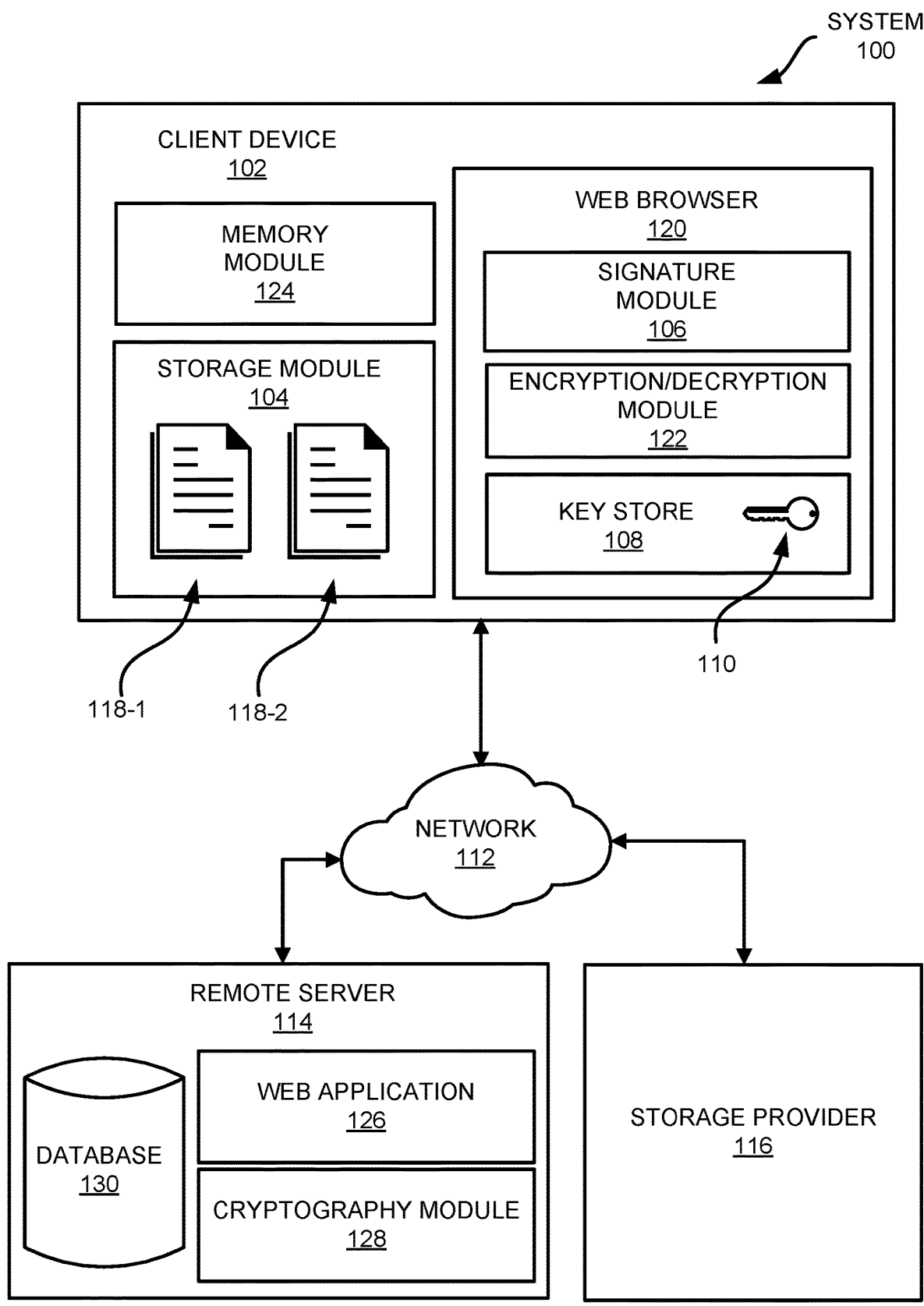
FIG. 1 shows an example system employing non-custodial techniques for data encryption and decryption.

Examples are described herein in the context of non-custodial techniques for data encryption and decryption. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

For many reasons, a user might wish to store data with a third-party storage provider. For example, storing large volumes of data locally might simply be inconvenient. As another example, a user might want to provide their data to a third party to monetize it. If the data is confidential, the user desiring to store their data with a storage provider is forced to trust the third party to respect and maintain their privacy. Encrypting the data after it is transferred to the storage provider is an inadequate solution because privacy might be compromised prior to encryption. Additionally, this approach requires the means and secrets pertaining to file encryption to remain in the hands of the storage provider. In particular, if the storage provider encrypts the data itself, it also has and must retain the encryption key used to do so, thereby potentially compromising the user's privacy in the event the storage provider is compromised by a malicious actor.

One solution to this problem is for the user to manually encrypt the data, prior to transmission to the storage provider. However, this leaves the user with the technical challenges of operating encryption software and key management. For most users, the risks and challenges associated with key management alone are substantial enough to make manual encryption an impractical solution.

A technique is therefore needed to enable a user to encrypt their data prior to transmission to the storage provider, without any particular knowledge of encryption technologies and without ceding control of encryption secrets to the storage provider. In other words, the storage provider must provide the means to the user to seamlessly encrypt their own data, using only secrets the user holds or can generate, prior to transmission to the storage provider.

To address these issues, in an example system, a user first uses a web application executing in a web browser to designate one or more files for encryption and storage with a third-party storage provider. The storage provider hosts a web application that includes an "Upload" button. When the user clicks the "Upload" button, a dialog box appears which allows the user to select one or more files for encryption and subsequently upload to the storage provider. This causes an encryption request to be transmitted to the storage provider.

In this example, the storage provider responds by first generating a secret token that is a randomly generated string, for example "abcd1234". This token is then included in a signing request that is sent to the user's web browser. The signing request directs the user's browser to cryptographically sign the secret token using a private cryptographic key that is available only to the user. The user authorizes software running in the web browser to cryptographically sign the secret token using their private key by entering a password known only to them. The cryptographic signature is created using an algorithm that generates an output that could only be generated by one having access to the private key and the randomly generated string. The signature takes the form, for example, of a hexadecimal value like 0x1e99398d.

In this example, this signature is then converted to a text string and used as input to a symmetric password-based encryption algorithm. This algorithm generates a symmetric encryption key using the cryptographic signature. The symmetric encryption key can then be used to encrypt the file(s) the user has designated by the web application executing in the web browser. At this point, the signature, which was used to generate the symmetric encryption key, and the symmetric encryption key itself, are both deleted from memory and never permanently stored at any location. The user's data is thus protected both by virtue of the user having sole access to their private key and by the storage provider's knowledge of the user's secret token—a malicious actor would need both items to access the user's encrypted data.

In this example, the encrypted files are then transmitted to the storage provider, which stores them. However, because the encryption key used to encrypt the files is not provided to the storage provider, the storage provider cannot access them, even though they possess the user's secret token. Because only the user possesses their private key and the means to access it, only the user can generate the signature that is used as a basis for generating the symmetric encryption key.

In this example, the inverse process is used to access the file(s) at a later time. In this example, the storage provider's web application includes a button labeled "Download" that the user may click indicating that the user desires to download their encrypted data. Upon clicking the "Download" button, a file decryption request is sent to the storage provider. The storage provider responds with a signing request that is sent to the user's browser, again containing the user's secret token, along with the encrypted files. The signing request directs the web application running in the user's browser to again cryptographically sign the secret token using the user's private key. This signature is then used as input to the same password-based encryption algorithm used to generate the symmetric encryption key used to encrypted the file(s). As before, this algorithm generates the symmetric encryption key using the cryptographic signature. Because the same information was used, the identical symmetric encryption key earlier used to encrypt the files is generated again and can now be used to decrypt the files. Once again, the signature and the symmetric encryption key itself are both deleted from memory and never permanently stored.

This illustrative example is given to introduce the reader to the general subject matter discussed herein and the disclosure is not limited to this example. The following sections describe various additional non-limiting examples and examples of non-custodial techniques for data encryption and decryption.

Referring now to FIG. 1, FIG. 1 shows an example system 100 employing non-custodial techniques for data encryption and decryption. The system includes a client device 102, a remote server 114, and a storage provider 116, which are connected across one or more networks, collectively network 112.

The client device 102 may be any suitable computing or communications device. For example, client device 102 may be a conventional computing device, such as a desktop or laptop computer having processors and computer-readable media, connected to the remote server 114 and the storage provider 116 via the internet or other suitable computer network 112. Suitable networks 112 include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets or smartphones.

The client device 102 has access to one or more files 118 containing confidential data. In some examples, the file(s) 118 are stored in a local storage module 104. However, the file(s) 118 can be stored anywhere that is normally accessible by client applications, such as a network drive, external drive, or locally-mounted cloud storage. The client device 102 includes a web browser 120 or similar application used to connect to the remote server 114 and storage provider 116 over the network 112. A native desktop application on a desktop computer or a dedicated mobile application on a smartphone could also be used. The web browser 120 may contain additional applications in the form of, for example, browser extensions, plug-ins, or other add-ons. The web browser 120 may be a blockchain browser, suitable for accessing web3 decentralized applications. The web browser 120 may have an integrated blockchain wallet. The memory module 124 provides for ephemeral storage of data during program execution.

In some examples, the web browser 120 includes a signature module 106, a key store 108, and an encryption/decryption module 122. These components may be installed as web browser 120 extensions or may reside in the browser runtime, for example, by way of Javascript code downloaded from a web application. In some examples, these components are standalone applications running outside of the web browser 120. In some examples, some or all of these components are implemented by a blockchain wallet. The blockchain wallet may itself be a web browser 120 extension. The blockchain wallet app may provide implementations of the components of the client device 102. The blockchain wallet app may use a standard application programming interface (API) that may comprise a signing method, digital signature algorithms, symmetric algorithms, asymmetric algorithms, or other components that can be used to implement one or more modules of the client device 102. Alternatively, the modules of the client device 102 may be implemented in the web browser 120 by the remote server 114, for example, using Javascript code. The blockchain wallet may also be implemented in the web browser 120 using a web application provided by the remote server 114, for example, using Javascript code.

The signature module 106 implements one or more digital signature algorithms. Some examples of digital signature algorithms that may be implemented by the signature module 106 include but are not limited to asymmetric cryptographic signing algorithms such as RSA (the signature operation of the Rivest-Shamir-Adleman asymmetric cryptosystem), DSA (Digital Signature Algorithm), and ECDSA (Elliptic Curve Digital Signature Algorithm). The signature module 106 obtains a private key 110 from the key store 108 in order to digitally sign input data to produce a cryptographic signature. In some examples, the signature module 106 requires the client device 102 to confirm the user's intent to carry out a digital signature.

The encryption/decryption module 122 implements one or more password-based encryption algorithms, such as implementations of the schemes specified in the publication IETF (Internet Engineering Task Force) RFC (Request for Comments) 8018, "PKCS [Public Key Cryptography Standards] #5: Password-Based Cryptography Specification." Such schemes include, but are not limited to, key derivation functions PBKDF1 (Password-Based Key Derivation Function 1) and PBKDF2 (Password-Based Key Derivation Function 2) as well as encryption schemes PBES1 (Password-Based Encryption Scheme 1) and PBES2 (Password-Based Encryption Scheme 2). Examples of algorithms suitable for key derivation function PBKDF2 include but are not limited to HMAC (Hash-Based Message Authentication Code) with SHA (Secure Hash Algorithm)-1, SHA-224, SHA-256, SHA-384, SHA-512, SHA-512/224, and SHA-512/256. In these examples of the Secure Hash Algorithm, the value following the letters SHA refers to the size, in bits, of the cryptographic hash, or digest. For example, SHA-512 refers to a cryptographic hash of 512 bits. An example cryptographic algorithm suitable for the PBES2 encryption scheme is AES (Advanced Encryption Standard)-CBC (Cipher Block Chaining)-Pad, but other algorithms may be used as well.

The key store 108 hosts a private key 110 used for carrying out digital signatures. The private key 110 is one of a pair of keys generated to implement a public key, or asymmetric, cryptographic algorithm, the other key being a public key. In an asymmetric algorithm, the security of the algorithm depends on keeping the private key secret. The private key may be used for operations like encryption and signing, while the corresponding public key may be used for the complementary operations like decryption and signature verification. The key store 108 may be a part of a web browser 120 extension or reside in memory module 124 or the web browser 120 runtime, for example as a result of the execution of Javascript code in the web browser 120. The key store 108 may also be a standalone application. In some examples, the key store 108 is implemented by a blockchain wallet, including storage of the private key 110. In some examples, the private key 110 is generated using a secret sharing algorithm, for example, Shamir's Secret Sharing. In that case, the key store 108 may host only a portion of the private key 110, and the remaining portions are hosted on remote devices (not shown).

The remote server 114 hosts the application that coordinates the non-custodial techniques for data encryption and decryption. The remote server 114 may host a web application 126. In some examples, the remote server 114 hosts backend services for a mobile application. The remote server also contains a cryptography module 128. The cryptography module 128 generates a secret token which may be unique for a given user and stores it in the database 130, keyed to each client device 102. In some examples, the secret token may take the form of binary data. In some embodiments, the secret token is a text string. It may be the same string for all users, or it may be a different string for all users. In some embodiments, the secret token may be a cryptographically secure randomly generated text string. The cryptography module 128 also generates the signing request, which may specify a signing algorithm. For example, the cryptography module 128 may specify that the client device 102 use ECDSA. This may be specified so that the same signing algorithm is used at both encryption and decryption time. In other examples, the signing algorithm may be implicit in the method call included in the signing request, as discussed in more detail below. The remote server 114 stores only the secret token. In some examples, neither the signature generated by the client device 102 nor the private key 110 are ever sent to nor stored by the remote server 114.

The storage provider 116 is a server that provides file storage services across the network 112. The storage provider 116 hosts and stores the encrypted file(s) 118. In some examples, the remote server 114 and the storage provider 116 are located in the same server. In some examples, the storage provider 116 is a cloud storage provider. For example, the remote server 114 may host a web application that coordinates the non-custodial techniques for data encryption and decryption. After the client device 102 encrypts the file(s) 118 using the techniques described herein, the file(s) 118 may be uploaded to the storage provider 116 for storage in their encrypted form.

Figure 2:
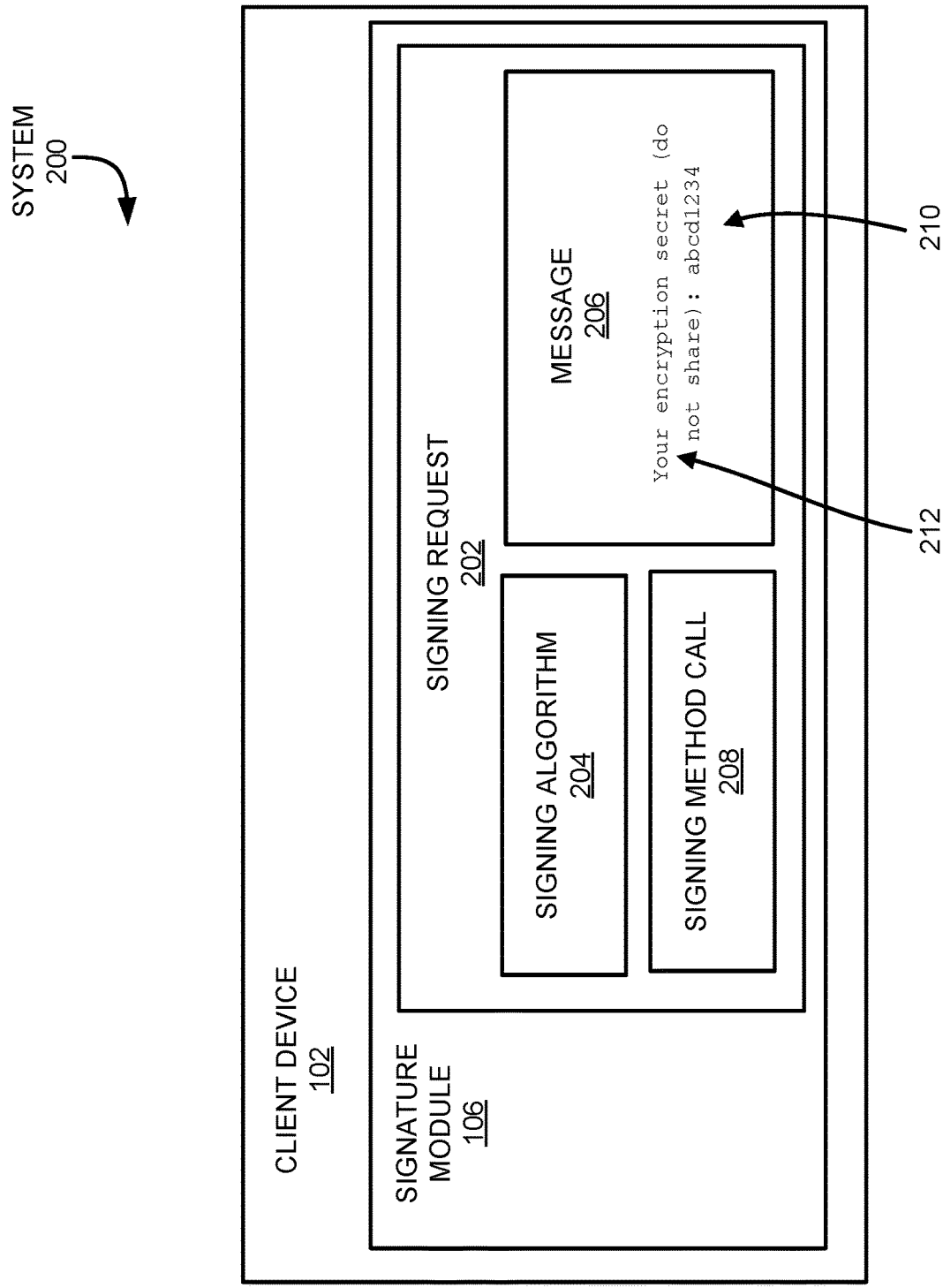
FIG. 2 shows an example system in which a client device receives a message signing request sent from a remote server.

Referring now to FIG. 2, FIG. 2 shows an example system 200 in which a client device 102 receives a message signing request 202 sent from a remote server 114 after transmitting a request to store encrypted file(s) 118 at the storage provider 116. The signing request 202 is received by the client device 102 and processed by the signature module 106. The signing request 202 contains a message 206 generated by the remote server 114, that includes the secret token 210 corresponding to the client device 102. The message 206 may contain text 212 that contains the secret token 210. The secret token 210 may be unique to each client device 102. The text 212 may be the same for each client device. In some examples, the text 212 is intended to make the message easier to understand for users; without the text 212, the message 206 will contain only the secret token 210 which might be unintelligible to some users. In some examples, the signing request 202 specifies a signing algorithm 204 for the client device 102 to use when signing the secret token. For example, the signing request 202 may specify that the client device 102 use ECDSA. This may be specified so that the same signing algorithm is used at both encryption and decryption time. The signing request may also (or instead) contain a signing method call 208. The signing method call 208 directs the signature module 106 to sign some data according to an API specification. For example, the signing method call 208 may correspond to the API specification published by a blockchain organization, such that the signing method call 208 will be available on the client device 102 in the signature module 106, regardless of the details of the implementation. In some examples, the signing method call 208 may specify the signature algorithm. In some other examples, the signing method call 208 may implicitly support only a single algorithm. For example, the signing method call 208 may be "eth_sign" which is a signature method that may be implemented in the client device 102. In this example, the API documentation may specify that a particular signature algorithm be used by the implementing client device 102. In some cases, the specified signing algorithm is ECDSA. Other methods may be used as well. For example, the "eth_signTypedData" from the publication EIP (Ethereum Improvement Proposal)-712 may be used in some implementations, which similarly implicitly specifies the signing and hash algorithms to be used by the client device 102.

Figure 3:
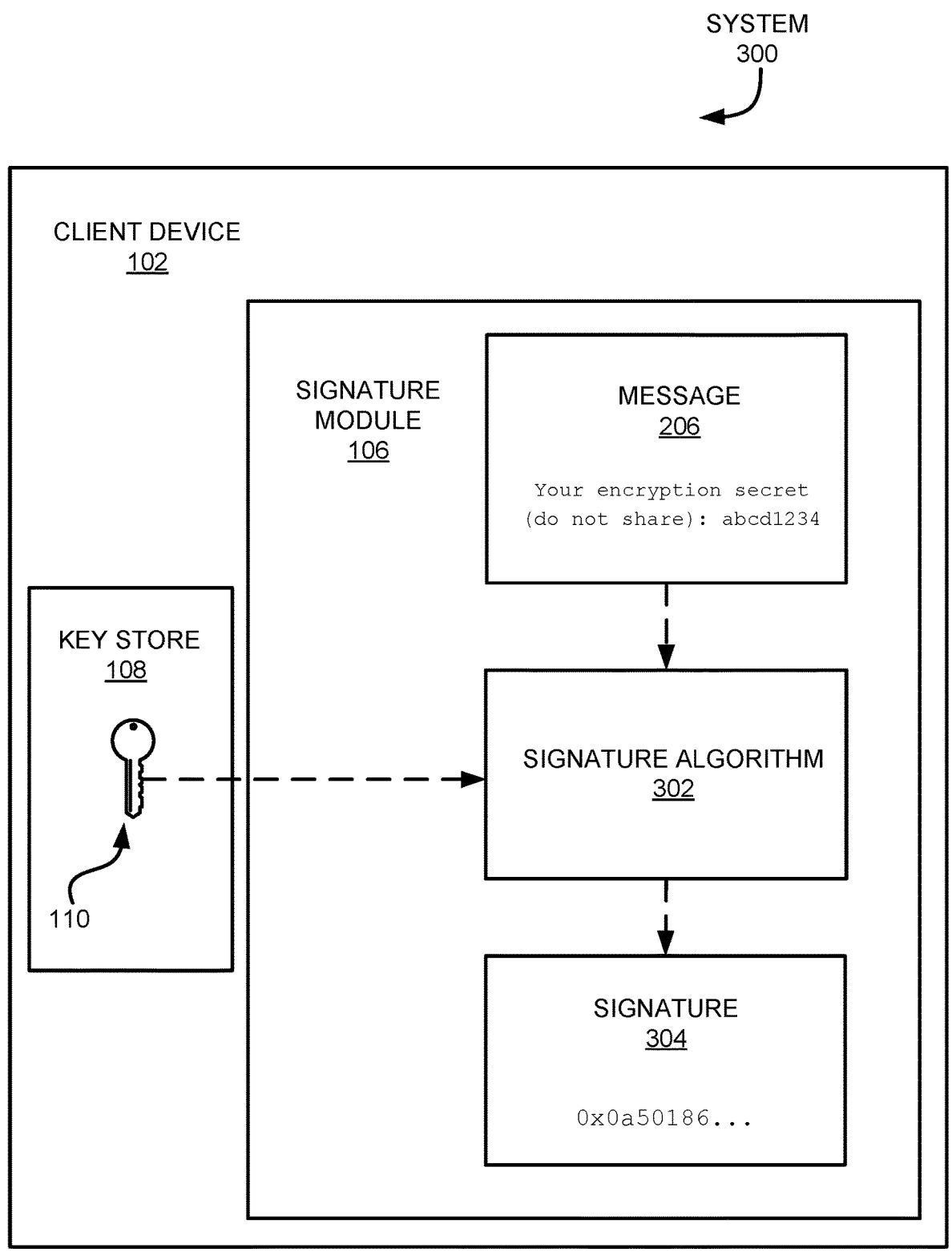
FIG. 3 shows an example system in which a client device digitally signs a message.

FIG. 3 shows an example system 300 in which a client device 102 digitally signs the message 206. The message 206 is processed by the signature module 106. The signature module 106 may select a signature algorithm 302 based on the algorithm 204 specified in the signing request 202. In some examples, the signature algorithm 204 is implicitly selected by the signing method call 208 used in the signing request 202. The selected signature algorithm 302 processes the message 206 along with the private key 110 obtained from the key store 108 to produce a signature 304. The signature algorithm 320 may first calculate the cryptographic hash of the message 206, and then sign the resulting hash. For instance, the SHA-3 or Keccak hash algorithm may be used to calculate the cryptographic hash of the message 206, and then ECDSA asymmetric signing algorithm may be used to sign the resulting hash. The signature 304 can be represented as a text string. In some examples, the signature 304 may be a cryptographic hash value.

Figure 4:
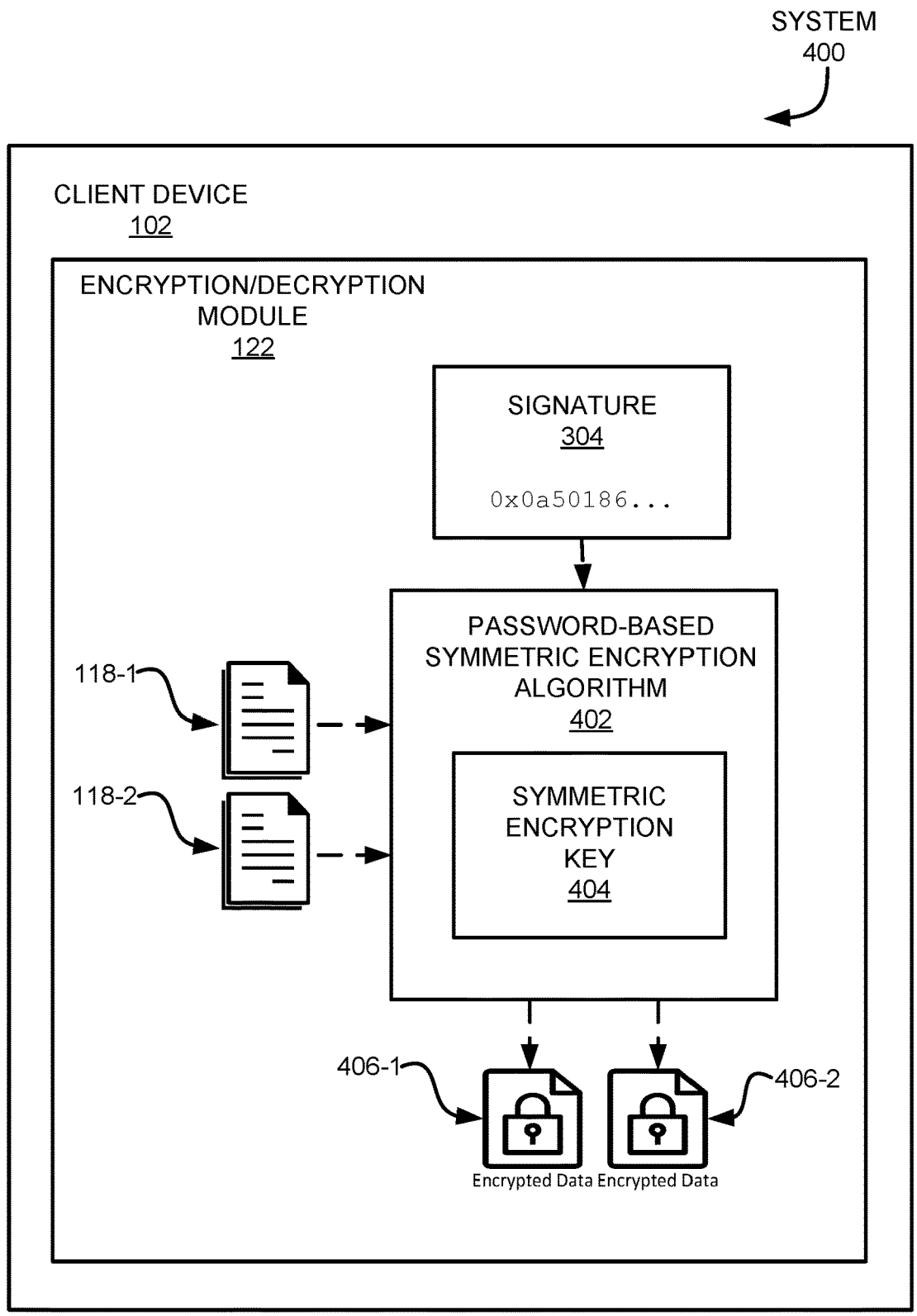
FIG. 4 shows an example system in which a client device encrypts one or more files.

FIG. 4 shows an example system 400 in which a client device 102 encrypts one or more files 118. In FIG. 4, the encryption/decryption module 122 receives the signature 304 from the signature module 106. The signature 304 is used by a symmetric password-based encryption algorithm 402 to derive a symmetric encryption key 404. A symmetric encryption algorithm is one in which the same key is used for both encryption and decryption. The security of a symmetric algorithm resides entirely in the security of the key. In this example, the symmetric encryption key 404 is derived from the signature 304 received from the signature module 106. At decryption time, the same signature 304 will be received from the signature module 106, which will be used to generate the same symmetric encryption key 404. In some examples, the symmetric password-based encryption algorithm 402 employs a salt or iteration count to bolster the security of the generated symmetric encryption key 404. The symmetric password-based encryption algorithm 402 then takes as input one or more files 118, encrypts the file(s) 118, and generates one or more encrypted files 406. The encrypted files 406 can only be decrypted with the identical symmetric encryption key 404 that was used to encrypt them. Therefore, the same symmetric password-based encryption algorithm 402 must be used, with the same configuration, to ensure that the same generated symmetric encryption key 404 is used at both encryption and decryption time.

In the inverse decryption process, the encryption/decryption module 122 receives the signature 304 from the signature module 106. The signature 304 is used by the symmetric password-based encryption algorithm 402 to derive a symmetric encryption key 404. The symmetric password-based encryption algorithm 402 then takes as input one or more encrypted files 406, decrypts the encrypted files 406, and generates one or more decrypted files 118.

Figure 5:
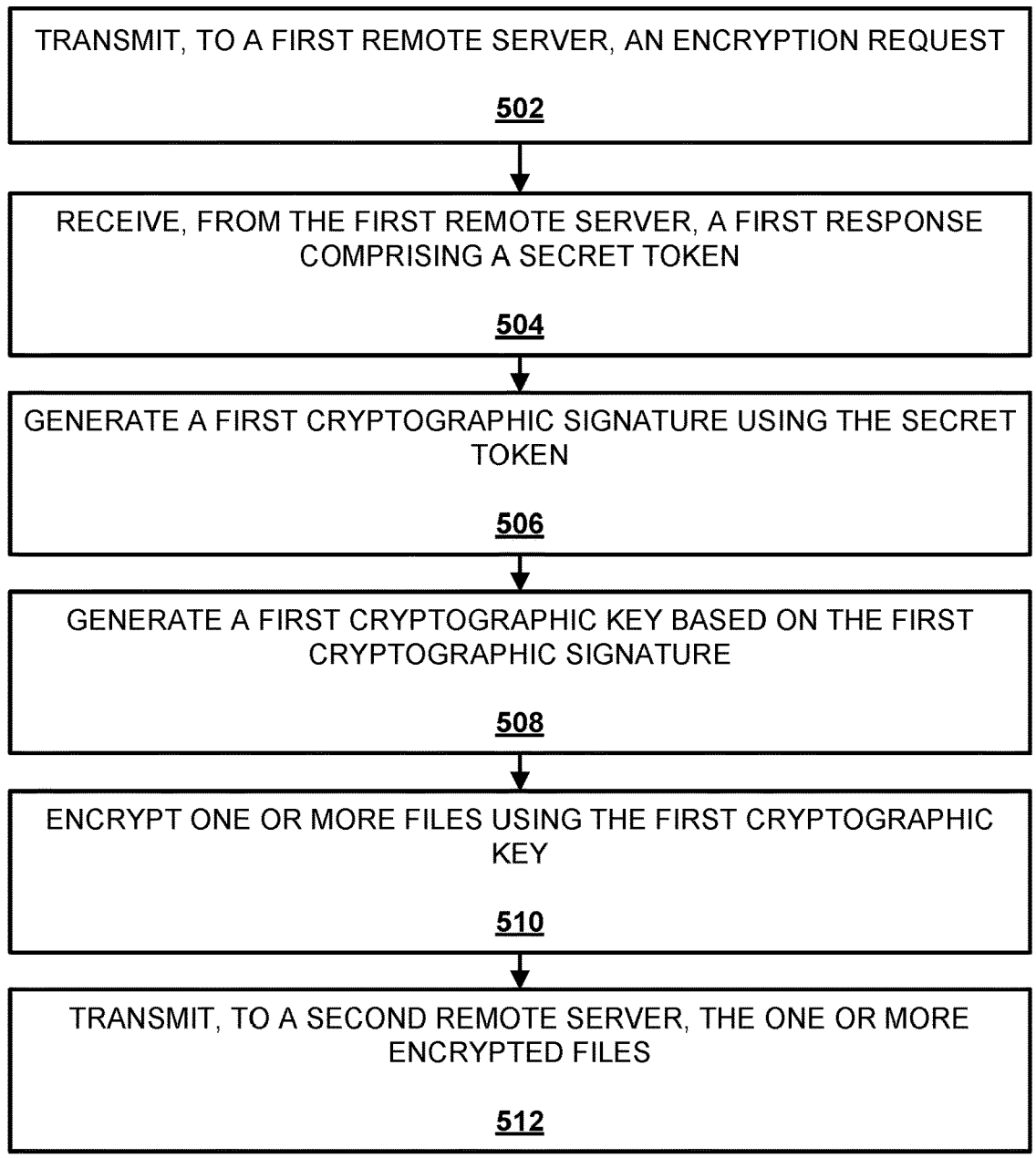
FIG. 5 shows an example method for employing non-custodial techniques for data encryption.
Figure 6:
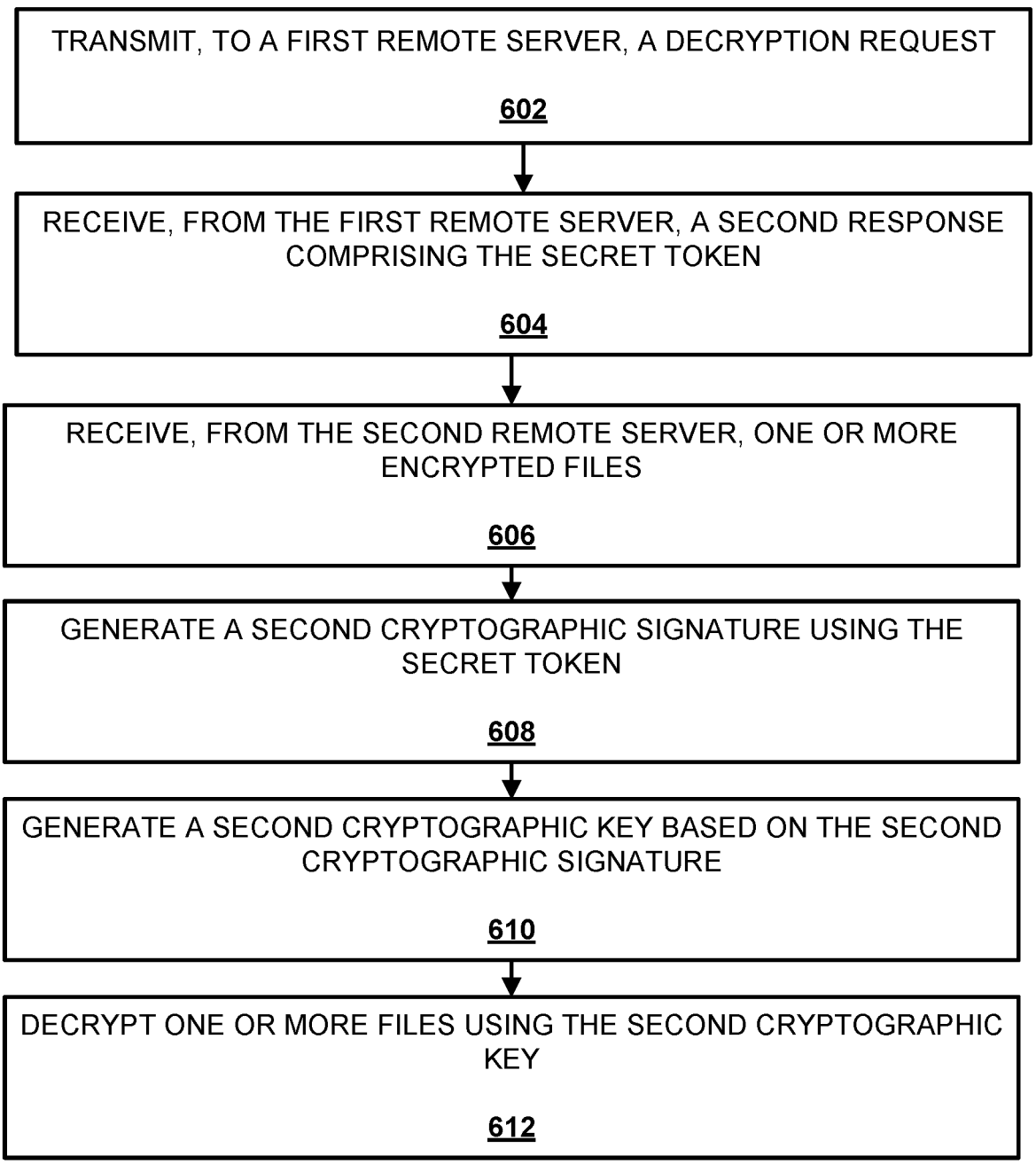
FIG. 6 shows an example method for employing non-custodial techniques for data decryption.
Figure 8:
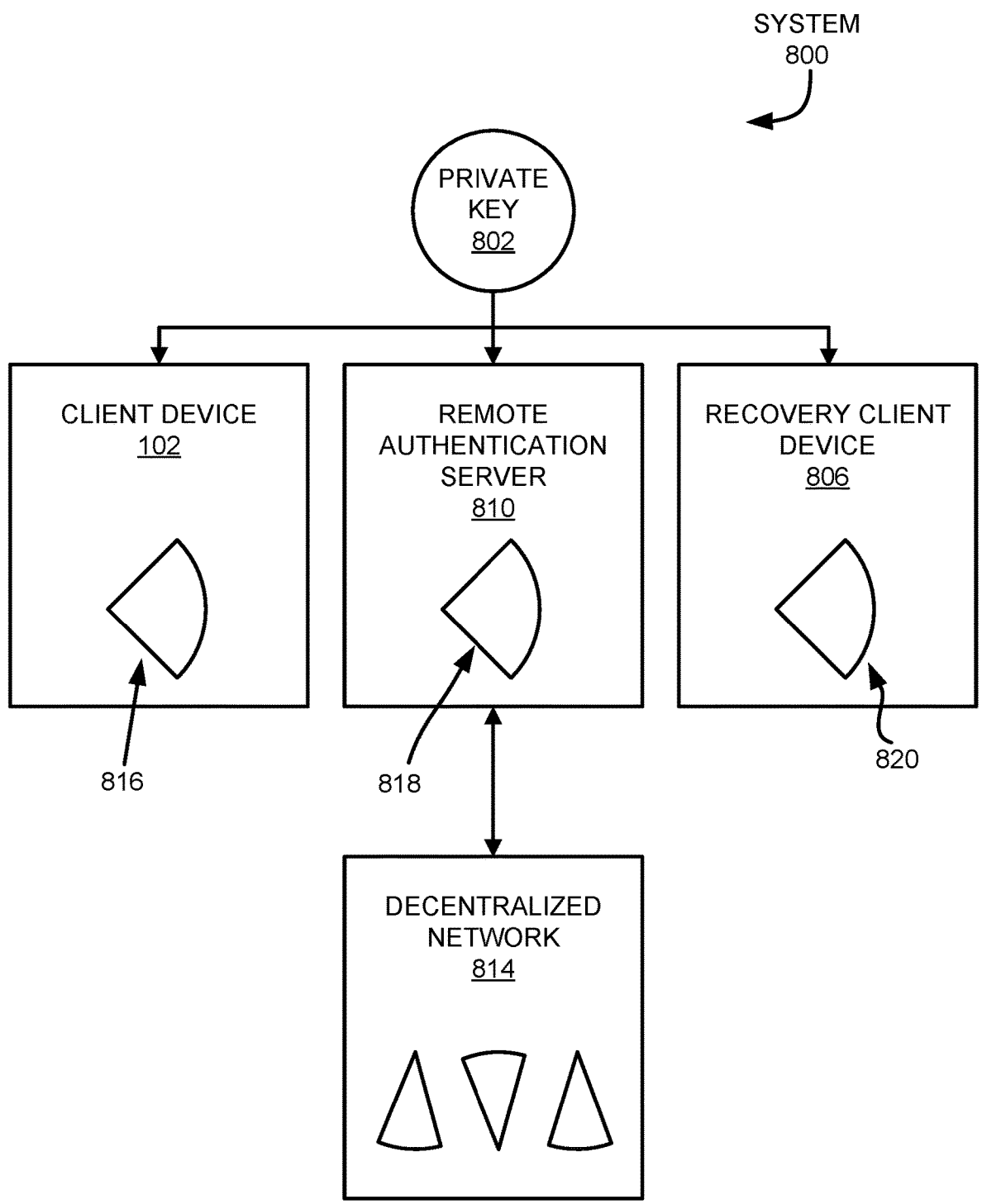
FIG. 8 shows an example system wherein a private key is distributed among several remote authentication servers.
Figure 9:
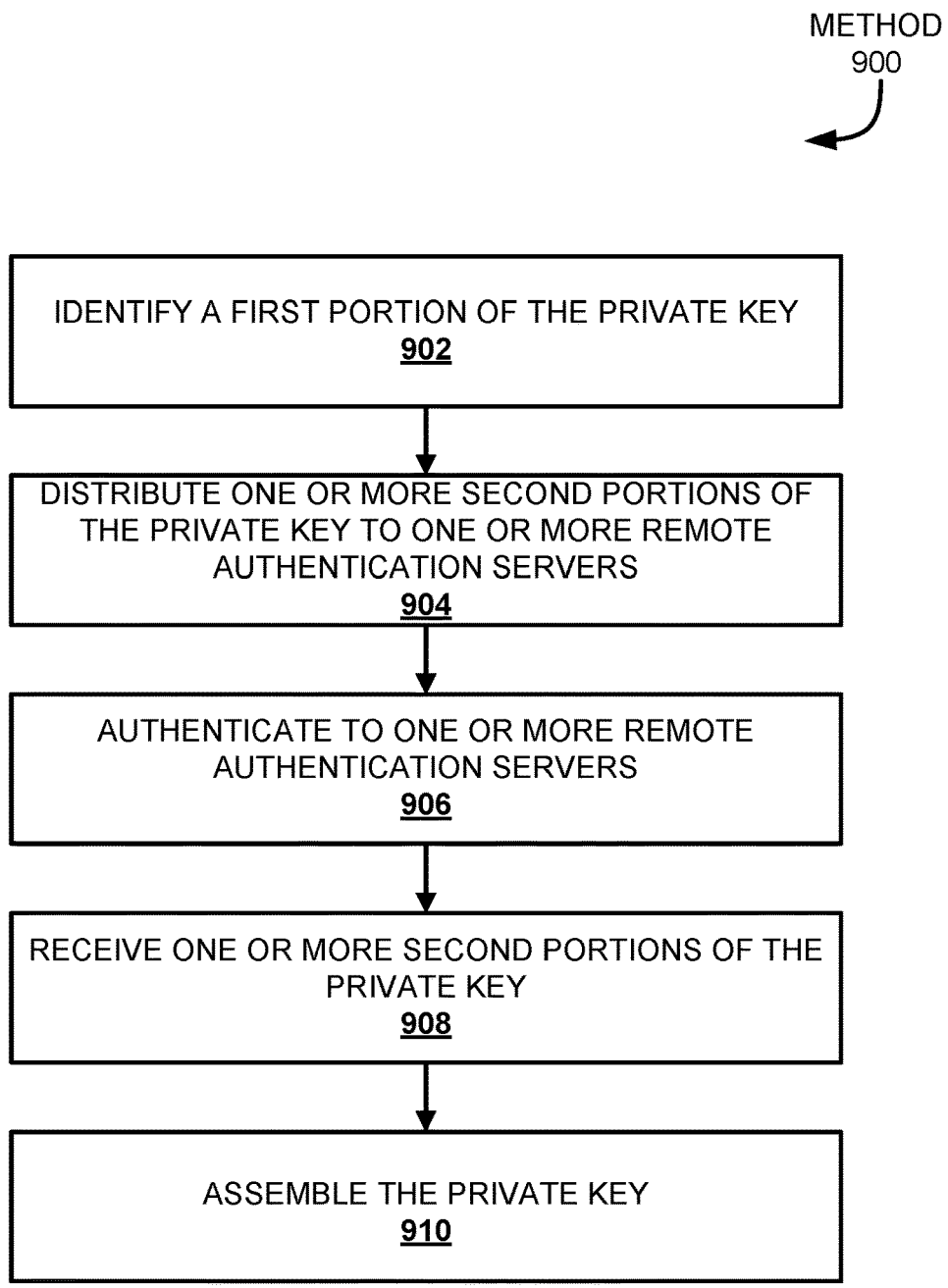
FIG. 9 shows an example method for assembling a private key.

FIGS. 5-6 and FIG. 9 show example methods for employing non-custodial techniques for data encryption. These methods can be implemented by the client device 102 of system 100, or any other system. These methods can be read with reference to the systems of FIGS. 1-4 or FIGS. 7-8 for illustrative purposes. It should be appreciated that these example methods provide particular methods for employing non-custodial techniques for data encryption. Other sequences of operations may also be performed according to alternative examples. For example, alternative examples of the present invention may perform the steps outlined above in a different order. Moreover, the individual operations illustrated by these methods may include multiple sub-operations that may be performed in various sequences as appropriate to the individual operation. Furthermore, additional operations may be added or removed depending on the particular applications. One of ordinary skill in the art would recognize many variations, modifications, and alternatives.

Turning to FIG. 5, method 500 involves a client device 102 transmitting an encryption request to a remote server 114 in step 502. As discussed above, the client device 102 may include a web browser 120 extension. The extension may be a blockchain wallet. In other examples, the client device 102 may be running a web application in the web browser 120 comprising Javascript code sent from the remote server 114. The encryption request may designate one or more files 118 for encryption. In some examples, the encryption request may contain details about the client device 102, for example, the type and version of the web browser 120 extension. The encryption request may specify API methods that the client device 102 supports.

In step 504, the client device 102 receives, from the remote server 114, a response which includes a secret token 210. In some examples, the response includes a message signing request 202. The signing request 202 may include a method call 208 corresponding to a standard API, which specifies the cryptographic algorithms to use. The signing request 202 may contain a message 206, which includes the secret token 210. The message may have other text 212, in addition to the secret token 210. The other text 212 may warn the user of the client device 102 to protect the security of the secret token 210.

In step 506, the client device 102 generates a cryptographic signature 304 of the message 206 containing the secret token 210. The signature 304 may be produced using a private key 110 stored on the client device 102, which is accessible only by the client device 102. The cryptographic algorithm 302 used may correspond to the method call 208 contained in the signing request 202, according to a standard API specification.

In step 508, the client device 102 generates a cryptographic key 404 using the cryptographic signature 304. The cryptographic key 404 may be generated by a symmetric password-based encryption algorithm, as discussed above.

In step 510, the client device 102 encrypts one or more files 118 using the generated cryptographic key 404. The cryptographic key 404 may be a symmetric key generated using a symmetric password-based encryption algorithm, as discussed above. Once the file(s) 118 are encrypted, both the cryptographic signature 304 and the cryptographic key 404 may be deleted from volatile memory and not permanently stored.

In step 512, the client device 102 transmits the one or more encrypted files 118 to a second remote server 116. The second remote server 116 may be a storage provider or it may be the same as the remote server 114. The file(s) 118 may be stored on the second remote server 116 until needed for some application or until the client device 102 requests a decryption operation.

In the event the file(s) 118 are needed for an application, the client device 102 may need to decrypt the file(s) 118 before they can be provided to the application. For instance, the application may be a third-party monetization provider. The user of the client device 102 may designate the file(s) 118 stored on the second remote server 116 for use by the third-party monetization provider. However, the client device 102 may first decrypt the file(s) 118 using, for example, the example method 600 below, before they can be transmitted to the third-party monetization provider. In some examples, the remote server 114 may facilitate the sharing of data with the third-party monetization provider.

FIG. 6 shows an example method 600 for employing non-custodial techniques for data decryption. The method 600 is generally the inverse of the process described in method 500 above. In step 602, the client device 102 transmits a decryption request to a remote server. In step 604, the client device 102 receives from the remote server, a response which includes the secret token 210. In some examples, the response may include a signing request 202. In step 606, the client device 102 additionally receives, from the remote server 114, one or more encrypted files 118. In step 608, the client device 102 generates a cryptographic signature 304 using the secret token 210. In step 610, the client device 102 generates a cryptographic key 404 based on the cryptographic signature 304. In step 612, the client device 102 decrypts the one or more encrypted files 118 using the cryptographic key 404. The identical symmetric cryptographic key 404 may be used for both the encryption and decryption operations. Once again, both the cryptographic signature 304 and the cryptographic key 404 may be deleted from volatile memory and not permanently stored.

Figure 7:
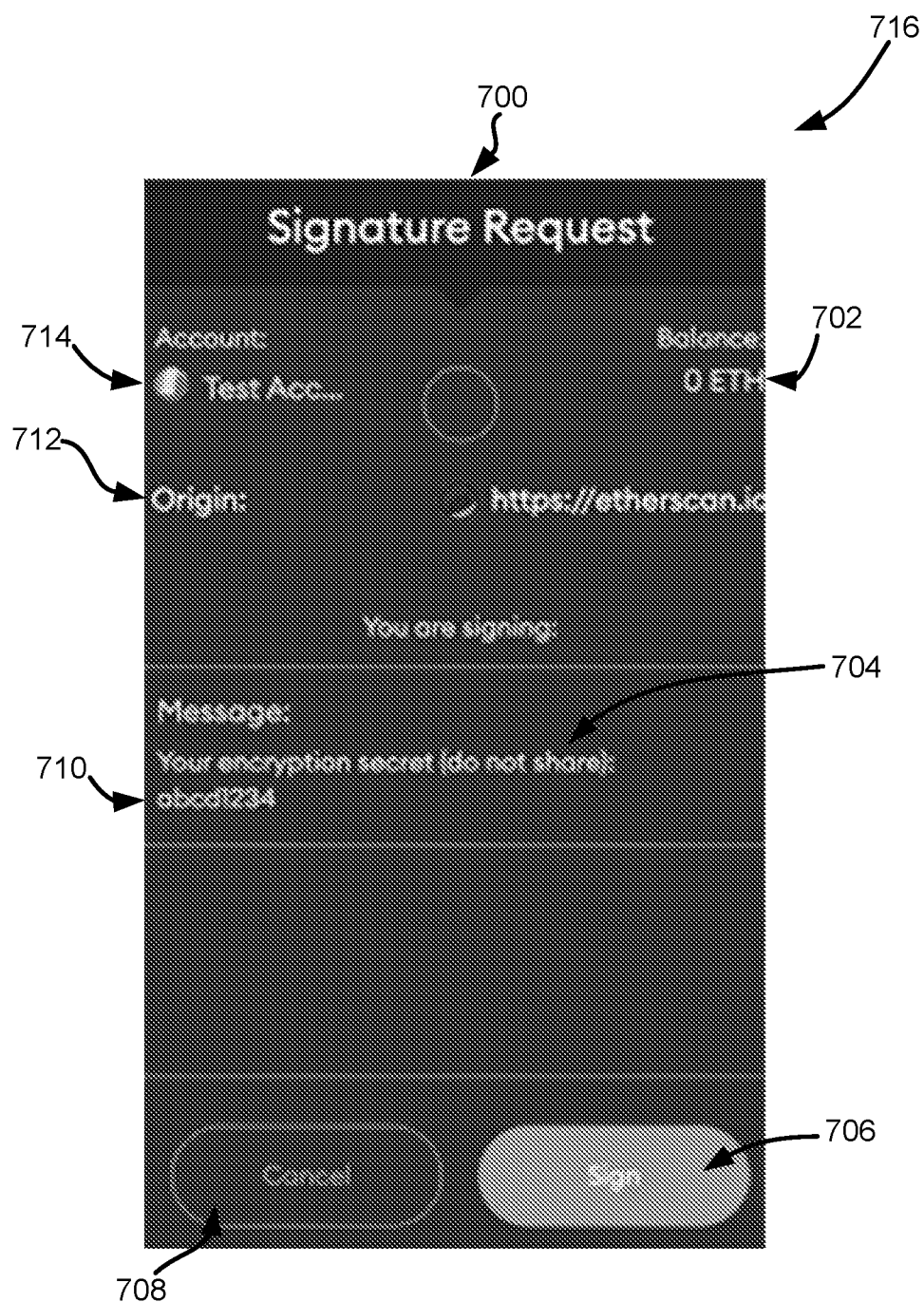
FIG. 7 illustrates a signing request being processed on a client device according to one example.

Turning now to FIG. 7, FIG. 7 illustrates a signing request 700 being processed on a client device 102 according to one example. In this example, the signing request 700 is being processed by a blockchain wallet app 716 running on a client device. As discussed above, the components of the client device components may be implemented by a blockchain wallet app 716. The blockchain wallet app 716 may be a web browser 120 extension. A blockchain wallet app 716 may be used to implement one or modules of the client device 102. For example, the blockchain wallet app 716 may be used to implement the signature module 106, the key store 107, or the encryption/decryption module 122. The blockchain wallet app 716 may use a standard API that comprises a signing method 207 that can be used to implement one or more modules of the client device. Alternatively, the modules of the client device may be implemented in the web browser 120 by the remote server 114, for example, using Javascript code. The balance 702 of the blockchain account 714 is an example of a typical detail that might be displayed on the signing request 700 running in a blockchain wallet app 716. The origin of the signing request 712 corresponds to the remote server 114 of system 100. The signing request 700 may include a message 704 which itself includes the secret token 710. The message 704 is included to make the text to be signed intelligible to the user. The blockchain wallet app 716 may include a sign button 706 to execute the cryptographic signature, as well as a cancel button 708 to halt the transaction.

Turning now to FIG. 8, FIG. 8 shows an example system 800 wherein a private key 802 is split and distributed among several remote authentication servers according to a secret sharing algorithm, such as Shamir's Secret Sharing. A split private key 802 improves security by requiring multiple conditions to be met prior to assembling a usable private key 802. For instance, in some examples, a locally stored private key 110 may be accessible using only a password. For a split private key 802, both a password and a remote login may be required. In that example, a first portion of the split key 802 is stored locally and a second portion of the split key 802 is stored on a remote server. Upon both conditions being met, the private key 802 may be assembled according to the secret sharing algorithm. The split key 802 then functions as usual as a private key 110. An arbitrary number of additional conditions may be added to increase the security of the split private key 802. For instance, a third condition may be a requirement for a hardware authentication device. In some examples, the minimum number of key portions, or shares, needed to possess a viable split private key 802 is called the threshold.

In some examples, the client device 102 contains a first portion 816 of the private key 802. Remote authentication server 810 contains a second portion 818 of the private key 802. This second portion 818 is protected by an authentication scheme provided by the remote authentication server 810. For example, a user might be required to login to the remote authentication server 810 using a social login or other single sign on ("SSO") authentication scheme. Alternatively, the remote authentication server 810 may use a "passwordless" login scheme. In some examples, a third portion 820 may be contained on a recovery client device 806, for example, for key recovery in the event that login credentials for the remote authentication server 810 are lost. The third portion 820 may be protected by a requirement to answer one or more security questions. In some examples, the second portion 818 of the private key may be further split and distributed 808 among nodes in a decentralized key management network 814.

FIG. 9 shows an example method 900 for assembling a split private key 802. In step 902, the client device 102 identifies a first portion 816 of the private key 802. For instance, the first portion 816 may be stored locally on the client device 102. The first portion 816 may require a password to access.

In step 904, one or more second portions 818 of the split private key 802 are distributed to one or more remote authentication servers 810. As part of the initialization of the secret sharing algorithm, a private key 802 must be generated and partitioned. After partitioning, in order to obtain a usable key, a plurality of the partitions must be reassembled. In order to increase security, one or more portions may be distributed to different locations to ensure heightened requirements must be met to obtain all portions. In some examples, the second portion(s) 818 are stored on different servers. The servers may be in the control of a third party, with standalone authentication requirements. The remote authentication servers 810 may store the second portion(s) 818 in any suitable manner. For instance, the second portion(s) may be stored on a cloud storage provider controlled by the remote authentication server 810.

In step 906, the client device 102 authenticates to one or more remote authentication servers 810. The authentication process of the remote authentication servers 810 may use a different authentication method than the method protecting the first portion 816. For instance, the first portion 816 may be protected by a password, where the second portion(s) 818 are protected by social logins.

In step 908, after authenticating, the client device 102 receives one or more second portions 818 of the split private key 802 from the remote authentication servers 810. The remote authentication server 810 may retrieve the second portion(s) 818 from a decentralized network 814 or they may be stored in some other suitable manner.

In step 910, the client device 102 assembles the first portion 816 and the one or more second portions 818 to obtain the private key 802. The first portion 816 and the one or more second portions 818 are reassembled according to the secret sharing algorithm. The reassembled split key 802 can they be used in a manner similar to the private key 110, for example, for use in a signature algorithm 302.

Figure 10:
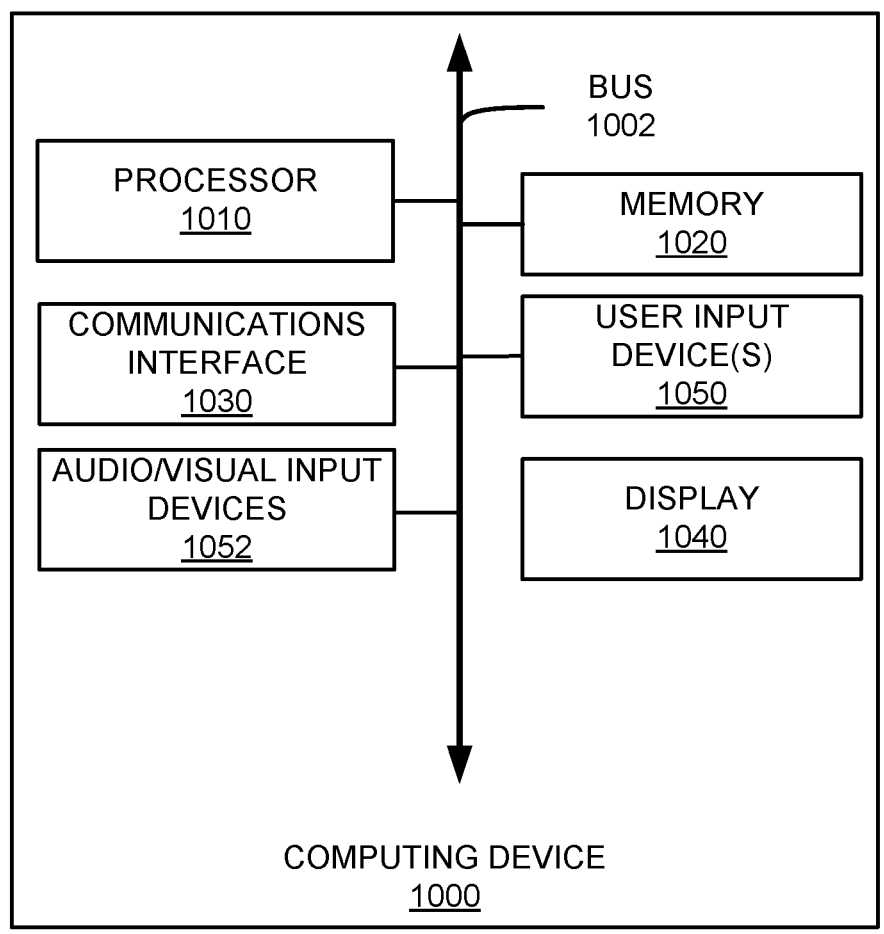
FIG. 10 shows an example computing device suitable for use with systems and methods for employing non-custodial techniques for data encryption and decryption.

Referring now to FIG. 10, FIG. 10 shows an example computing device 1000 suitable for use in example systems or methods employing non-custodial techniques for data encryption and decryption in this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for employing non-custodial techniques for data encryption and decryption according to different examples, such as part or all of the example methods 500, 600, 900 described above with respect to FIGS. 1-4 and FIG. 7. The computing device 1000, in this example, also includes one or more user input devices 1050, such as a keyboard, mouse, touchscreen, microphone, etc., to accept user input. The computing device 1000 also includes a display 1040 to provide visual output to a user.

The computer device 1000 may also include one or more audio/visual input devices 1052 to enhance a user's ability to give input to or receive input from a multimedia application or feature, such as a video conference, entertainment application, accessibility features, VR headset, or the like.

The computing device 1000 also includes a communications interface 1040. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
transmitting, to a first remote server, an encryption request, wherein the encryption request identifies one or more files;
receiving, from the first remote server, a first response comprising a secret token;
accessing a key store, comprising a private key;
generating a first cryptographic signature, comprising cryptographically signing the secret token using the private key;
generating a first cryptographic key based on the first cryptographic signature;
encrypting the one or more files using the first cryptographic key;

deleting the first cryptographic signature and the first cryptographic key; and transmitting, to a second remote server, the one or more encrypted files.

2. The method of claim 1, wherein the second remote server is a cloud storage provider.

3. The method of claim 1, wherein the first cryptographic signature is generated using an asymmetric cryptographic algorithm and the private key.

4. The method of claim 1, wherein the private key is created using a secret sharing algorithm, further comprising:

identifying a first portion of the private key;

distributing one or more second portions of the private key to one or more remote authentication servers;

authenticating to the one or more remote authentication servers;

receiving, from the one or more remote authentication servers, the one or more second portions of the private key; and assembling, from the first portion and the one or more second portions, the private key.

5. The method of claim 1, wherein the first cryptographic key based on the first cryptographic signature is generated using a symmetric password-based encryption algorithm.

6. The method of claim 1, further comprising:

transmitting, to the first remote server, a file decryption request;

receiving, from the first remote server, a second response comprising the secret token;

receiving, from the second remote server, the one or more encrypted files;

generating a second cryptographic signature using the secret token, wherein the second cryptographic signature is identical to the first cryptographic signature;

generating a second cryptographic key based on the second cryptographic signature;

decrypting the one or more encrypted files using the second cryptographic key; and deleting the second cryptographic signature and the second cryptographic key.

7. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

transmit, to a first remote server, an encryption request, wherein the encryption request identifies one or more files;

receive, from the first remote server, a first response comprising a secret token;

access a key store, comprising a private key;

generate a first cryptographic signature, comprising cryptographically signing the secret token using the private key;

generate a first cryptographic key based on the first cryptographic signature;

encrypt the one or more files using the first cryptographic key;

delete the first cryptographic signature and the first cryptographic key; and transmitting, to a second remote server, the one or more encrypted files.

8. The system of claim 7, wherein the second remote server is a cloud storage provider.

9. The system of claim 7, wherein the secret token is a randomly generated string.

10. The system of claim 7, wherein the first cryptographic signature is generated using an asymmetric cryptographic algorithm and the private key.

11. The system of claim 7, wherein the private key is created using a secret sharing algorithm, further comprising:

identifying a first portion of the private key;

distributing one or more second portions of the private key to one or more remote authentication servers;

authenticating to the one or more remote authentication servers;

receiving, from the one or more remote authentication servers, the one or more second portions of the private key; and assembling, from the first portion and the one or more second portions, the private key.

12. The system of claim 9, wherein the first cryptographic key based on the first cryptographic signature is generated using a symmetric password-based encryption algorithm.

13. The system of claim 7, further comprising:

transmitting, to the first remote server, a file decryption request;

receiving, from the first remote server, a second response comprising the secret token;

receiving, from the second remote server, the one or more encrypted files;

generating a second cryptographic signature using the secret token, wherein the second cryptographic signature is identical to the first cryptographic signature;

generating a second cryptographic key based on the second cryptographic signature;

decrypting the one or more encrypted files using the second cryptographic key; and deleting the second cryptographic signature and the second cryptographic key.

14. A non-transitory computer-readable medium comprising processor-executable instructions configured to cause one or more processors to:

transmit, to a first remote server, an encryption request, wherein the encryption request identifies one or more files;

receive, from the first remote server, a first response comprising a secret token;

access a key store, comprising a private key;

generate a first cryptographic signature, comprising cryptographically signing the secret token using the private key;

generate a first cryptographic key based on the first cryptographic signature;

encrypt the one or more files using the first cryptographic key;

delete the first cryptographic signature and the first cryptographic key; and transmitting, to a second remote server, the one or more encrypted files.

15. The non-transitory computer-readable medium of claim 14, wherein the second remote server is a cloud storage provider.

16. The non-transitory computer-readable medium of claim 14, wherein the secret token is a randomly generated string.

17. The non-transitory computer-readable medium of claim 14, wherein the first cryptographic signature is generated using an asymmetric cryptographic algorithm and the private key.

18. The non-transitory computer-readable medium of claim 14,
   wherein the non-transitory computer-readable medium is further configured to:
   identify a first portion of the private key;
   distribute one or more second portions of the private key to one or more remote authentication servers;
   authenticate to the one or more remote authentication servers;
   receive, from the one or more remote authentication servers, the one or more second portions of the private key; and
   assemble, from the first portion and the one or more second portions, the private key.

19. The non-transitory computer-readable medium of claim 16, wherein the first cryptographic key based on the first cryptographic signature is generated using a symmetric password-based encryption algorithm.

20. The non-transitory computer-readable medium of claim 14,
   wherein the non-transitory computer-readable medium is further configured to:
   transmit, to the first remote server, a file decryption request;
   receive, from the first remote server, a second response comprising the secret token;
   receive, from the second remote server, the one or more encrypted files;
   generate a second cryptographic signature using the secret token, wherein the second cryptographic signature is identical to the first cryptographic signature;
   generate a second cryptographic key based on the second cryptographic signature;
   decrypt the one or more encrypted files using the second cryptographic key; and
   delete the second cryptographic signature and the second cryptographic key.

\* \* \* \* \*